UNITED STATES PATENT OFFICE.

EDWARD A. JONES, OF CHESHIRE, CONNECTICUT.

COATING AND SEALING COMPOUND.

1,403,327.     Specification of Letters Patent.     Patented Jan. 10, 1922.

No Drawing. Application filed July 18, 1919, Serial No. 311,823. Renewed October 20, 1921. Serial No. 509,203.

*To all whom it may concern:*

Be it known that I, EDWARD A. JONES, a citizen of the United States, and a resident of Cheshire, in the county of New Haven and State of Connecticut, have invented a new and useful Coating and Sealing Compound, of which the following is a specification.

The object of my present invention is the production of a compound available for coating surfaces generally, after the manner and for the preservative effect of the application of a paint, and for sealing purposes generally, as the calking of cracks and the filling of the pores of fibrous materials.

My compound consists of a mixture of a cementitious dry-form product, an oleaginous product in liquid form, a dryer, and coloring matter as may be required.

The cementitious product used in the production of my improved compound is that commonly and commercially known as Portland cement; the oleaginous product is of a vegetable character and that commonly and commercially known as raw linseed oil; and the dryer used is preferably that commonly and commercially known as Japan dryer, coloring matter being generally added in such proportion as found needful by the user.

In preparing the compound I purpose using the ingredients in about the following proportions, viz.:

Liquid oleaginous product _____ .35
Cementitious product _____ .55
Dryer _____ .05
Coloring matter, say _____ .05

The proportions of the ingredients may be varied, however, to a wide extent, without sacrificing the good results obtainable, and as may be found appropriate to widely vary the consistency of the mass,—more oleaginous vehicle and less cementitious product being used where a so-called enamel surface finish is required, the compound being applied as is customary in applying paint; and less oleaginous vehicle and a materially increased relative proportion of the cementitious product being used where the compound is to be applied for the calking or filling of cracks or the pores of fibrous materials, the compound in this latter instance, and particularly when used for the setting of panes of glass, approximating the consistency of workable putty; and in any case, through the oxidation thereof under the action of the atmosphere thereon, ultimately assuming the character of a coating and sealing medium of marked firmness or resistance.

The ingredients of my improved compound are readily obtainable as commercial products; and it will be noted that the compound is not only quite inexpensive as regards its production, but highly efficient as an agent for the coating of surfaces generally, and the sealing of cracks, including the pores of fibrous materials.

I claim:

1. A coating and sealing compound consisting only of Portland cement, linseed oil, Japan dryer and coloring matter, in substantially the proportions specified.

2. A coating and sealing compound consisting only of Portland cement, linseed oil and Japan dryer, in substantially the proportions specified.

EDWARD A. JONES.